US012063432B2

(12) United States Patent
Osawa

(10) Patent No.: US 12,063,432 B2
(45) Date of Patent: Aug. 13, 2024

(54) INFORMATION PROCESSING APPARATUS, INFORMATION PROCESSING METHOD, AND STORAGE MEDIUM

(71) Applicant: CANON KABUSHIKI KAISHA, Tokyo (JP)

(72) Inventor: Takaharu Osawa, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 29 days.

(21) Appl. No.: 17/549,036

(22) Filed: Dec. 13, 2021

(65) Prior Publication Data

US 2022/0201220 A1 Jun. 23, 2022

(30) Foreign Application Priority Data

Dec. 17, 2020 (JP) ................................. 2020-209353

(51) Int. Cl.
*H04N 23/63* (2023.01)
*G06F 3/04817* (2022.01)
*H04N 23/61* (2023.01)
*H04N 23/695* (2023.01)

(52) U.S. Cl.
CPC ....... *H04N 23/632* (2023.01); *G06F 3/04817* (2013.01); *H04N 23/61* (2023.01); *H04N 23/695* (2023.01)

(58) Field of Classification Search
None
See application file for complete search history.

(56) References Cited

U.S. PATENT DOCUMENTS

| 9,330,478 | B2* | 5/2016 | Anderson | G06T 19/006 |
| 9,596,412 | B2* | 3/2017 | Lee | H04N 23/632 |
| 2011/0150447 | A1* | 6/2011 | Li | H04N 23/959 |
| | | | | 382/255 |
| 2012/0019709 | A1* | 1/2012 | Yen | H04N 23/635 |
| | | | | 348/E5.042 |
| 2012/0069235 | A1* | 3/2012 | Imai | H04N 23/71 |
| | | | | 348/E5.045 |

(Continued)

FOREIGN PATENT DOCUMENTS

| JP | 2005165991 A | 6/2005 |
| JP | 2011209620 A | 10/2011 |

(Continued)

*Primary Examiner* — Stefan Gadomski
(74) *Attorney, Agent, or Firm* — Canon U.S.A., Inc. IP Division

(57) ABSTRACT

An information processing apparatus includes a computer executing instructions that, when executed by the computer, cause the computer to acquire an image captured by an image capturing apparatus, to cause a display to display the acquired image, and to perform control process for controlling an image capturing range of the image capturing apparatus. A first placement candidate in which an object in the image capturing range is placed at a first position, and a second placement candidate in which the object in the image capturing range is placed at a second position different from the first position are displayed on the display. In a case where one of the first and second placement candidates is selected by a user, the image capturing range is controlled based on information of the selected placement candidate.

7 Claims, 10 Drawing Sheets

(56) References Cited

U.S. PATENT DOCUMENTS

| | | | | |
|---|---|---|---|---|
| 2012/0249816 A1* | 10/2012 | Li | ............... | H04N 23/67 |
| | | | | 348/241 |
| 2013/0235250 A1* | 9/2013 | Fainstain | ............ | H04N 23/675 |
| | | | | 348/E5.055 |
| 2014/0267869 A1* | 9/2014 | Sawa | ............ | H04N 23/66 |
| | | | | 348/333.03 |
| 2015/0116552 A1* | 4/2015 | K Hre | ............ | H04N 23/676 |
| | | | | 348/252 |
| 2015/0201123 A1* | 7/2015 | Koguchi | ............ | H04N 23/635 |
| | | | | 348/239 |
| 2016/0070409 A1* | 3/2016 | Uyama | ............ | G06F 3/0485 |
| | | | | 345/173 |
| 2016/0094774 A1* | 3/2016 | Li | ............ | G06V 10/25 |
| | | | | 348/222.1 |
| 2016/0094790 A1* | 3/2016 | Yu | ............ | H04N 21/6587 |
| | | | | 348/169 |
| 2016/0247288 A1* | 8/2016 | Omori | ............ | G06V 10/751 |
| 2016/0277724 A1* | 9/2016 | Linåker | ............ | H04N 13/271 |
| 2016/0373660 A1* | 12/2016 | Saito | ............ | H04N 23/675 |
| 2017/0034421 A1* | 2/2017 | Yamazaki | ............ | H04N 23/80 |
| 2019/0271898 A1* | 9/2019 | Sakai | ............ | G02F 1/29 |

FOREIGN PATENT DOCUMENTS

| | | | |
|---|---|---|---|
| JP | 5317607 B2 | 10/2013 | |
| JP | 2013247508 A | 12/2013 | |
| JP | 2014216965 A | 11/2014 | |

* cited by examiner

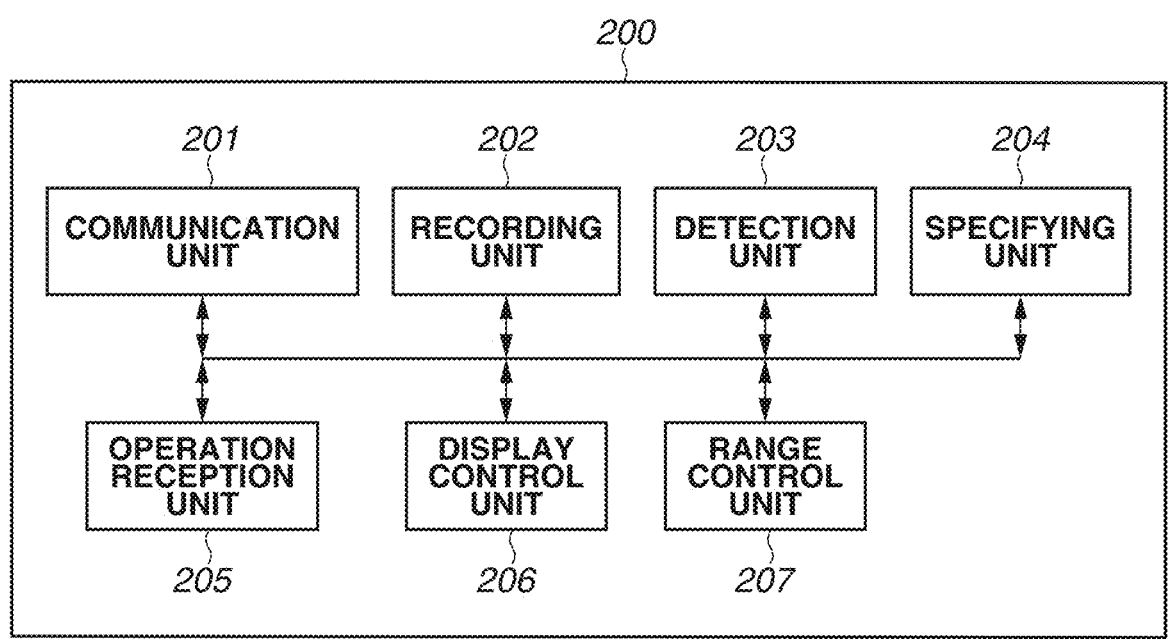

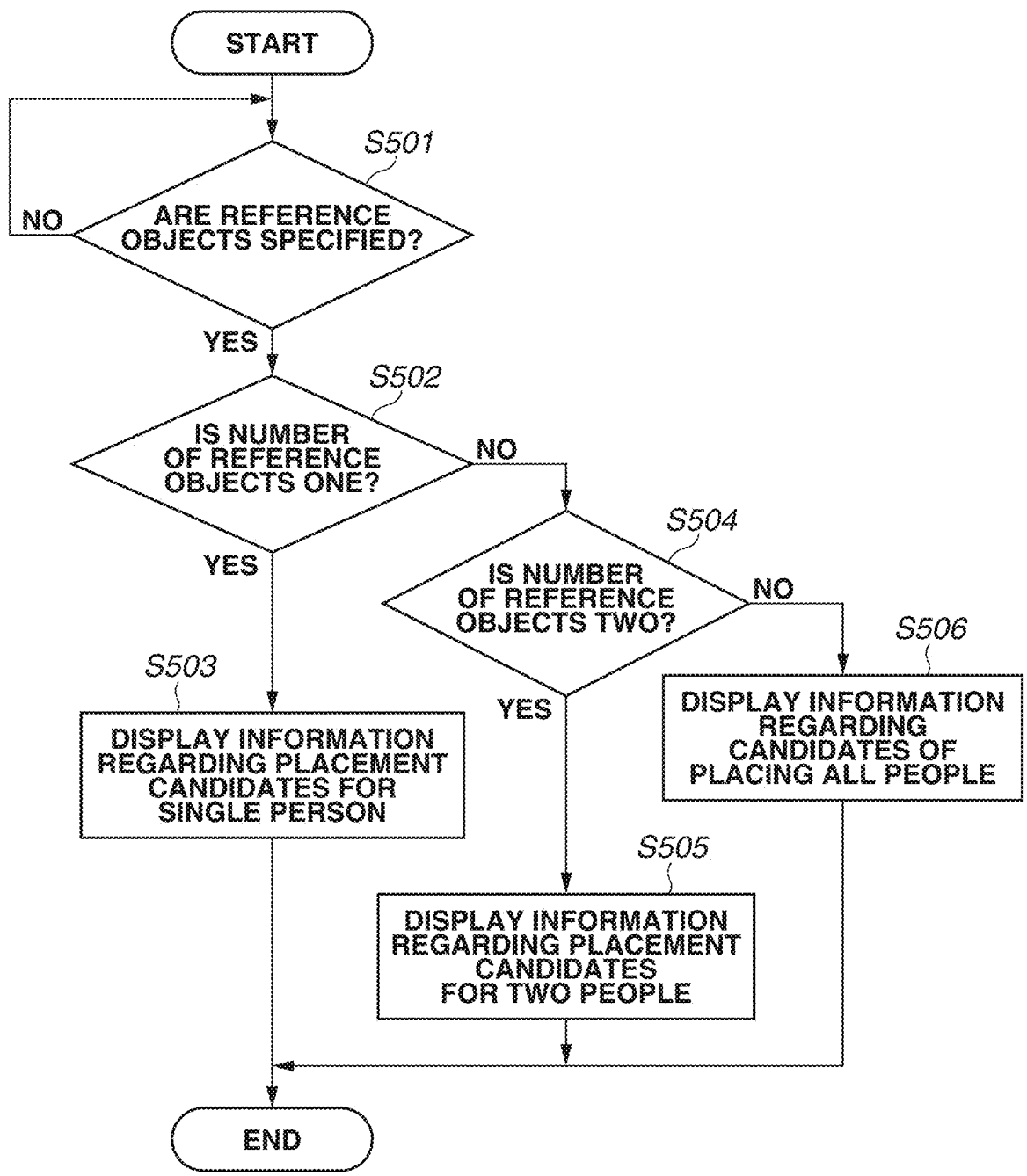

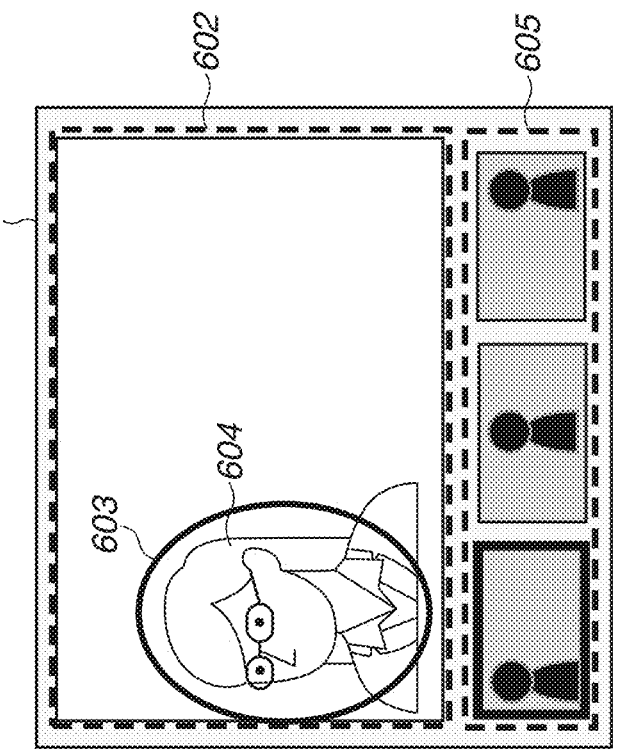
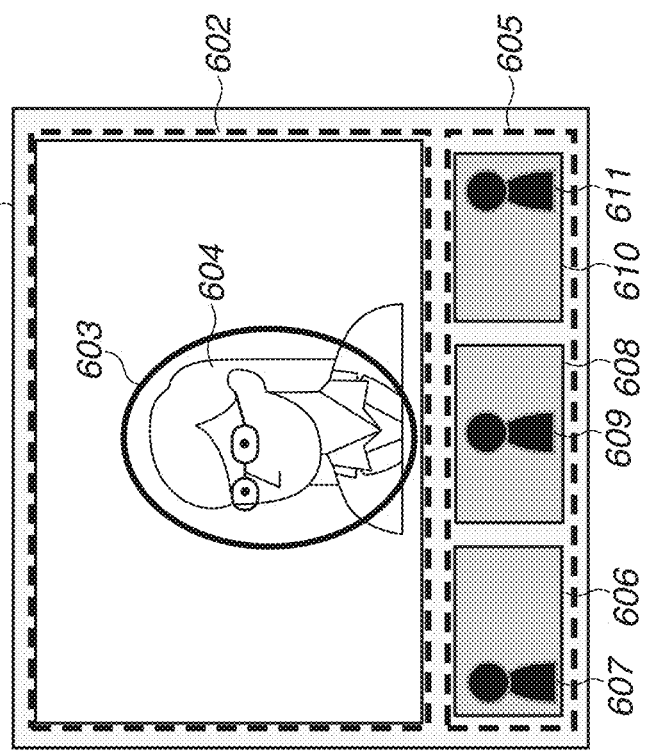

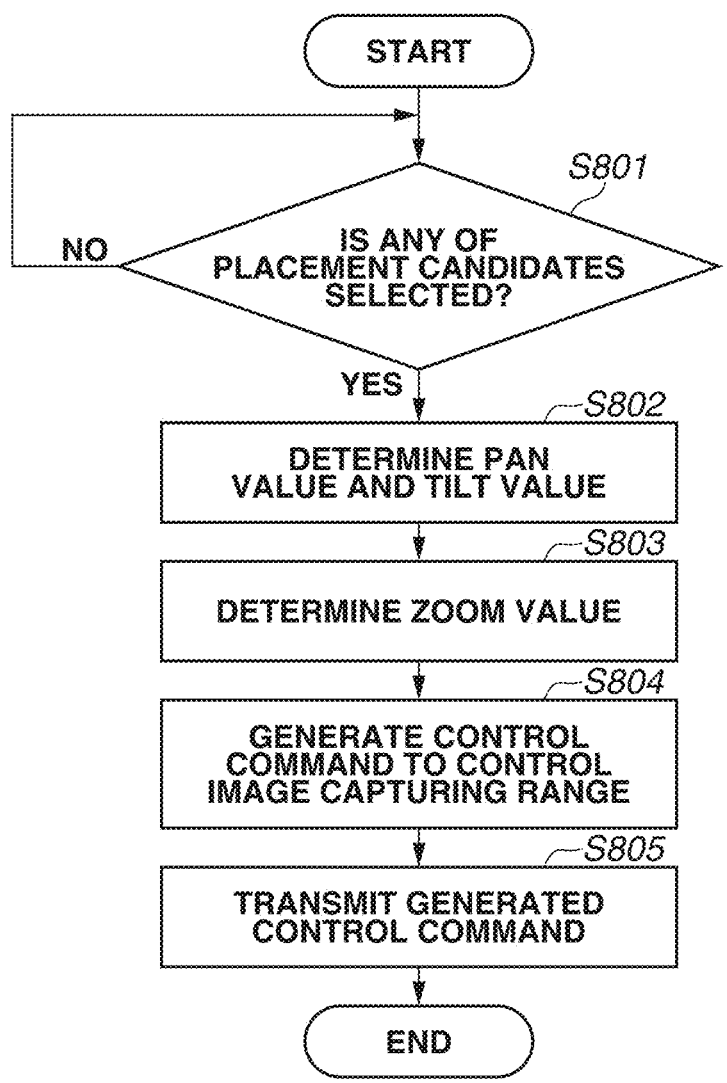

INFORMATION PROCESSING APPARATUS, INFORMATION PROCESSING METHOD, AND STORAGE MEDIUM

BACKGROUND OF THE DISCLOSURE

Field of the Disclosure

The present disclosure relates to an information processing method.

Description of the Related Art

More systems have been used that control imaging apparatuses connected to networks at remote sites. These systems employ an application that controls the pan, tilt, and zoom (PTZ) of an imaging apparatus to change the range of an image captured by it (hereinafter, the "image capturing range") with the image captured by the imaging apparatus on screen. A user who uses the application can change the image capturing range using a device such as a joystick.

There is a method of controlling the PTZ based on the position and/or size of an object as a method of controlling the image capturing range of an imaging apparatus. The publication of Japanese Patent Application Laid-Open No. 2011-209620 discusses a technique of calculating the ratio between the entire area of an object and a partial area (the head) of the object and controlling the zoom magnification while keeping the calculated ratio constant based on the zoom operation to capture an image of the object in a desired image capturing range.

There is a need of photographers who wish to control the image capturing range to bring an object to be placed at a desired position in the image capturing range in an intended composition. However, the user performs complicated operations involving controlling the image capturing range to bring the object to be placed at the desired position in the image capturing range while controlling the PTZ using the joystick.

SUMMARY OF THE DISCLOSURE

To provide a simple control of an image capturing range to place an object at the position desired by a user in the image capturing range, for example, according to an aspect of the present disclosure, an information processing apparatus includes a computer executing instructions that, when executed by the computer, cause the computer to acquire an image captured by an image capturing apparatus, to cause a display to display the acquired image, and to perform control process for controlling an image capturing range of the image capturing apparatus. A first placement candidate in which an object in the image capturing range is placed at a first position, and a second placement candidate in which the object in the image capturing range is placed at a second position different from the first position are displayed on the display. In a case where one of the first and the second placement candidates is selected by a user, the image capturing range is controlled based on information of the selected placement candidate.

Further features of the present disclosure will become apparent from the following description of exemplary embodiments with reference to the attached drawings.

BRIEF DESCRIPTION OF THE DRAWINGS

FIG. 4 illustrates a functional block diagram of an information processing apparatus.

FIG. 5 is a flowchart illustrating a processing procedure of displaying placement candidates.

FIGS. 6A and 6B illustrates an example of an image and placement candidates on a display.

FIG. 8 is a flowchart illustrating a processing procedure of controlling an image capturing range.

DESCRIPTION OF THE EMBODIMENTS

Some exemplary embodiments according to the present disclosure will be described below with reference to the attached drawings. The configurations illustrated in the following exemplary embodiments are mere examples, and do not limit the configurations according to the present disclosure.

Figure 1:
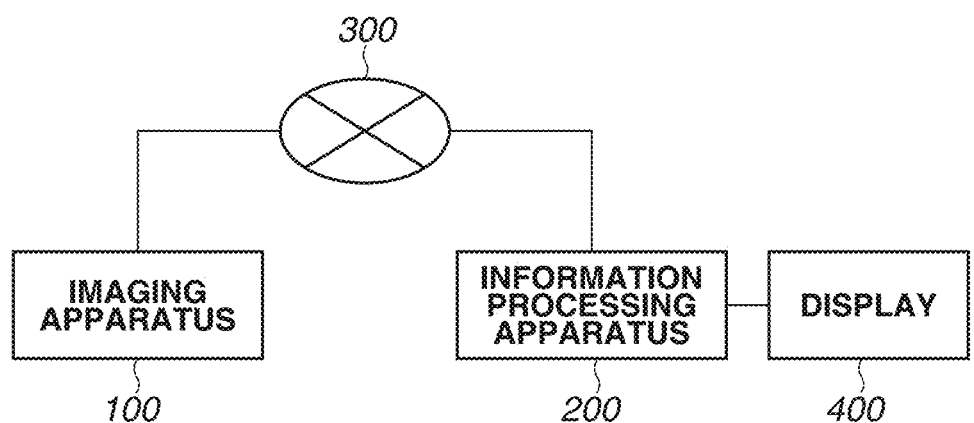
FIG. 1 illustrates an example of a system.

FIG. 1 illustrates the configuration of a system according to a first exemplary embodiment. The system according to the present exemplary embodiment includes an imaging apparatus 100, an information processing apparatus 200, a display 400, and a network 300.

The imaging apparatus 100 and the information processing apparatus 200 are connected to each other via the network 300. The network 300 includes a plurality of routers, switches, and cables compliant with communication standards such as Ethernet®.

The network 300 may be the Internet, a wired local area network (LAN), a wireless LAN, or a wide area network (WAN).

The imaging apparatus 100 is an apparatus to capture images, and functions as an imaging unit capable of controlling its image capturing range. The imaging apparatus 100 transmits image data about the captured image, information regarding the image capturing date and time when the image was captured, identification information identifying the imaging apparatus 100, and information regarding the image capturing range of the imaging apparatus 100 to an external apparatus such as the information processing apparatus 200 via the network 300. The information processing apparatus 200 is a client apparatus such as a personal computer in which programs to carry out the functions of image processing described below are installed. The system according to the present exemplary embodiment includes a single imaging apparatus 100, but may include a plurality of imaging apparatuses 100. That is, a plurality of imaging apparatuses 100 may be connected to the information processing apparatus 200 via the network 300. In this case, for example, using identification information associated with a transmitted image, the information processing apparatus 200 determines which of the imaging apparatuses 100 has captured the transmitted image.

The display 400 includes a liquid crystal display (LCD) to display images captured by the imaging apparatus 100. The display 400 is connected to the information processing apparatus 200 via a display cable compliant with communication standards such as High-Definition Multimedia Interface (HDMI). The display 400 and the information processing apparatus 200 may be included in a single housing.

Figure 2:
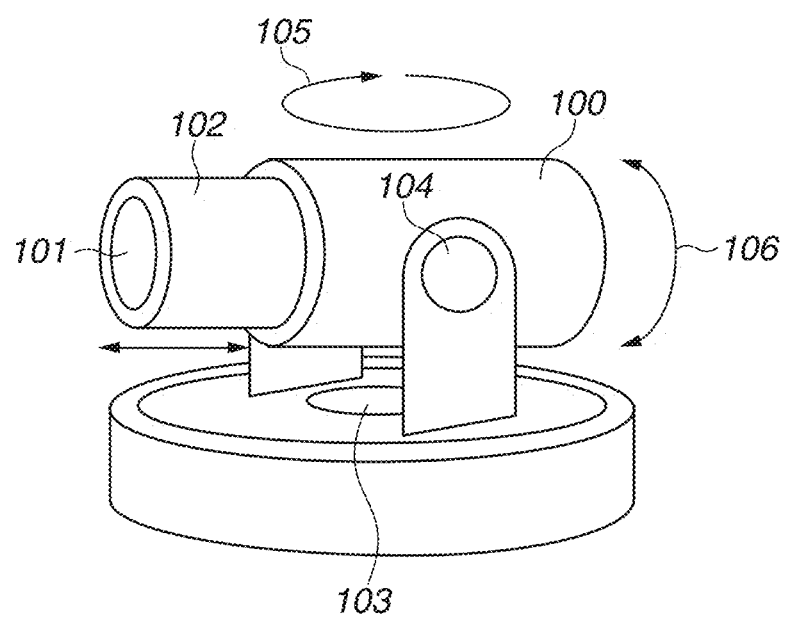
FIG. 2 illustrates an external appearance example of an imaging apparatus.
Figure 3:
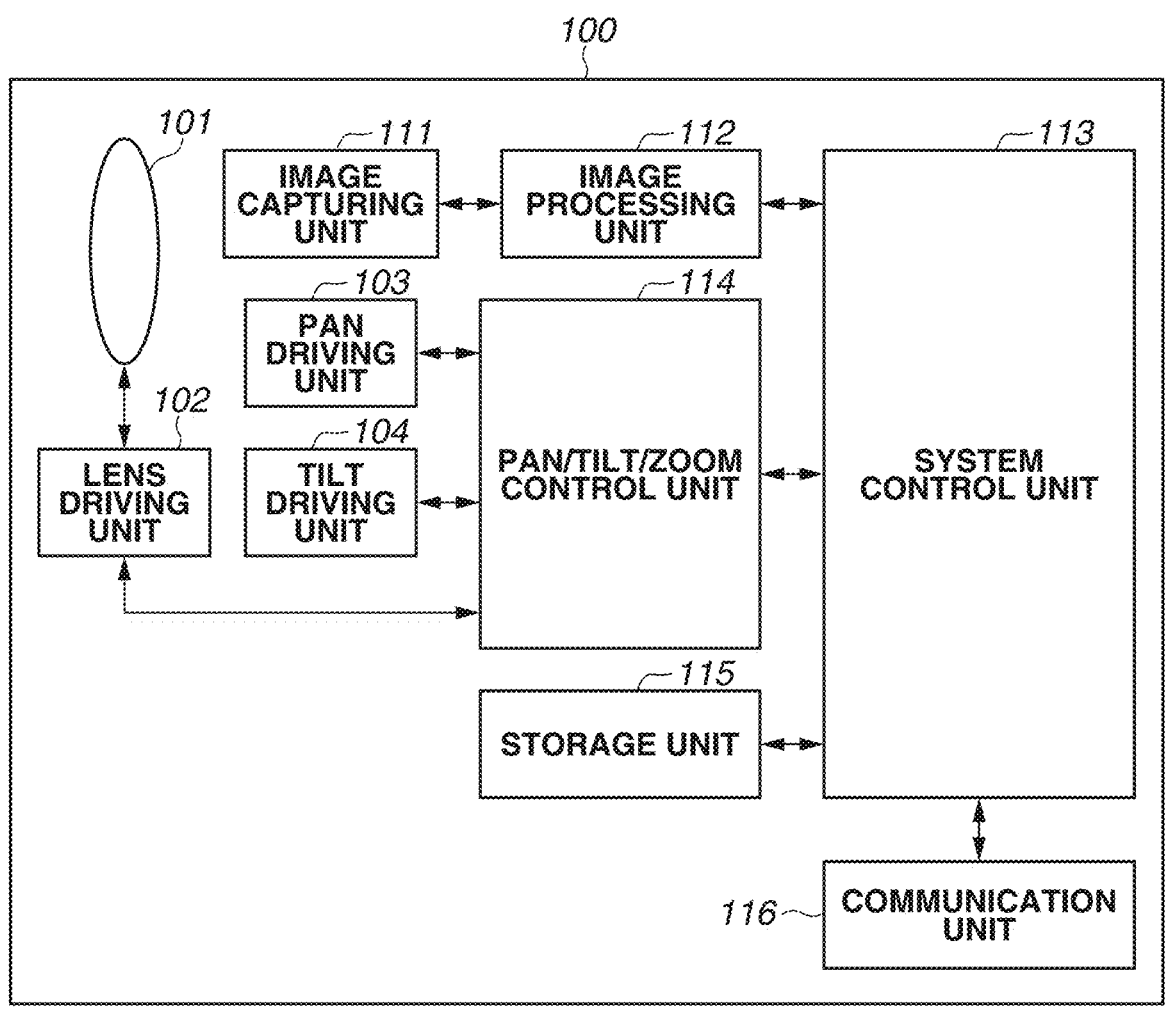
FIG. 3 illustrates a functional block diagram of the imaging apparatus.

Next, the imaging apparatus 100 according to the present exemplary embodiment will be described with reference to FIGS. 2 and 3. FIG. 2 is an example of an external view of the imaging apparatus 100 according to the present exemplary embodiment, FIG. 3 is a functional block example of the imaging apparatus 100 according to the present exemplary embodiment. The functions of an image processing unit 112, a system control unit 113, a pan/tilt/zoom control unit 114, a storage unit 115, and a communication unit 116 of the functional blocks of the imaging apparatus 100 illustrated in FIG. 3 are carried out as follows. These functions are carried out by a central processing unit (CPU) 1000 of the imaging apparatus 100, which will be described below with reference to FIG. 10, running computer programs stored in a read-only memory (ROM) 1020 of the imaging apparatus 100.

The direction of the optical axis of a lens 101 is the direction of capturing images by the imaging apparatus 100. A light beam having passed through the lens 101 forms an image on an image sensor of an image capturing unit 111 of the imaging apparatus 100. A lens driving unit 102 includes a driving system to drive the lens 101. The lens driving unit 102 changes the focal length of the lens 101. The lens driving unit 102 is controlled by the pan/tilt/zoom control unit 114.

A pan driving unit 103 includes a mechanical driving system to perform pan operation and a motor as a driving source. The pan driving unit 103 is driven to perform control for rotational driving to change the image capturing direction of the imaging apparatus 100 in a pan direction 105. The pan driving unit 103 is controlled by the pan/tilt/zoom control unit 114.

A tilt driving unit 104 includes a mechanical driving system to perform tilt operation and a motor as a driving source. The tilt driving unit 104 is driven to perform control for rotational driving to change the image capturing direction of the imaging apparatus 100 in a tilt direction 106. The tilt driving unit 104 is controlled by the pan/tilt/zoom control unit 114.

The image capturing unit 111 includes an image sensor (not illustrated) such as a charge-coupled device (CCD) sensor or a complementary metal-oxide-semiconductor (CMOS) sensor. The image capturing unit 111 photoelectrically converts an object image formed through the lens 101, thereby generating an electric signal. The image processing unit 112 performs image processing such as the process of converting the electric signal obtained through the photoelectric conversion by the image capturing unit 111 into a digital signal, and a compression coding process, thereby generating image data.

Based on an instruction transmitted from the system control unit 113, the pan/tilt/zoom control unit 114 controls the pan driving unit 103, the tilt driving unit 104, and the lens driving unit 102, thereby controlling the pan, tilt, and zoom of the imaging apparatus 100.

For example, the storage unit 115 stores (holds) information indicating the image capturing range. The communication unit 116 communicates with the information processing apparatus 200 via an interface (I/F) 1040 described below with reference to FIG. 10. For example, the communication unit 116 transmits image data about an image captured by the imaging apparatus 100 to the information processing apparatus 200 via the network 300. The communication unit 116 also transmits information indicating the image capturing range of the imaging apparatus 100. The communication unit 116 also receives a control command to control the imaging apparatus 100 transmitted from the information processing apparatus 200. Then, the communication unit 116 transmits the control command to the system control unit 113.

Figure 10:
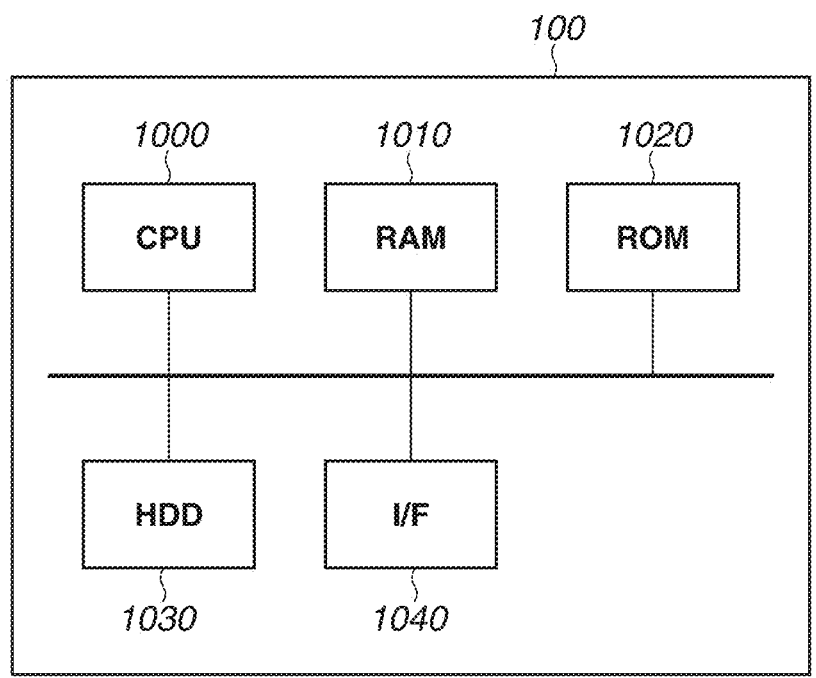
FIG. 10 illustrates a hardware configuration of each apparatus.

The system control unit 113 controls the imaging apparatus 100 generally and, for example, performs the following processes based on the processing performed by the CPU 1000 described below with reference to FIG. 10. The system control unit 113 analyzes the control command to control the imaging apparatus 100 transmitted from the information processing apparatus 200, to perform processing based on the control command. The system control unit 113 also instructs the pan/tilt/zoom control unit 114 to perform pan, tilt, and zoom operations. In transmitting image data generated by the image processing unit 112 to the information processing apparatus 200, the system control unit 113 also adds information regarding the image capturing time when the image data was captured to the image data.

The image capturing range according to the present exemplary embodiment is determined based on the pan value, the tilt value, and the zoom value of the imaging apparatus 100. The pan value is the angle of the image capturing direction (the optical axis) in the pan direction 105 of the imaging apparatus 100 from 0° at one of the driving ends of the pan driving unit 103. The tilt value is the angle of the image capturing direction (the optical axis) in the tilt direction 106 of the imaging apparatus 100 from 0° at one of the driving ends of the tilt driving unit 104. The zoom value of the imaging apparatus 100 when an image is captured by the imaging apparatus 100 is calculated based on the focal length of the lens 101.

image processing in the information processing apparatus 200 according to the present exemplary embodiment will be described with reference to the functional blocks of the information processing apparatus 200 according to the present exemplary embodiment illustrated in FIG. 4. The functions of the information processing apparatus 200 are carried out as follows using a ROM 1020 and a CPU 1000 described below with reference to FIG. 10. The functions illustrated in FIG. 4 are carried out by the CPU 1000 of the information processing apparatus 200 running computer programs stored in the ROM 1020 of the information processing apparatus 200.

A communication unit 201 acquires image data transmitted from the imaging apparatus 100 via an interface (I/F) 1040 described below with reference to FIG. 10. A recording unit 202 can work with a random-access memory (RAM) 1010 or a hard disk drive (HDD) 1030 described below with reference to FIG. 10 and records information and data related to information processing in the information processing apparatus 200. For example, the recording unit 202 records information regarding the position of an object detected on an image. The recording unit 202 also records controllability information indicating which of the pan value, the tilt value, and the zoom value the imaging apparatus 100 can control.

A detection unit 203 performs a detection process to detect an object in an image acquired by the communication unit 201. The detection unit 203 according to the present exemplary embodiment performs a process such as pattern matching using a collation pattern (a dictionary), thereby detecting a person as an object included. In the image. In detecting a person on the image, the detection unit 203 may detect the person on the image using a plurality of collation patterns including a collation pattern for a person facing the front and a collation pattern for a person facing sideways. The detection process using the collation patterns is thus performed, leading to an expectation of an improvement in detection accuracy.

Examples of collation patterns prepared may include a collation pattern for a person viewed at another angle such as in an oblique direction or an upward direction. To detect a person on the image, collation patterns (a dictionary) indicating the features of the whole body may not be prepared, and a collation pattern for a part of a person, such as the upper body, the lower body, the head, the face, or the legs may be prepared In the present exemplary embodiment, a person is detected as an object detected on the image. In some embodiments, other kinds of body such as a vehicle are detected, instead of a person. The detection unit 203 according to the present exemplary embodiment uses pattern matching processing as a method of detecting a particular body on the image. In some embodiments, the detection unit 203 detects a particular body on an image using another conventional technique.

A specifying unit 204 specifies the object included in the image as a reference for control of the image capturing range of the imaging apparatus 100. The image capturing range of the imaging apparatus 100 is controlled using as the reference the object (the person) in the image specified by the specifying unit 204. The process will be described in detailed below in which the specifying unit 204 specifies the object included in the image as a reference for control of the image capturing range.

An operation reception unit 205 receives operations performed by a user through an input device (not illustrated) such as a keyboard and a mouse. A display control unit 206 displays the image acquired by the communication unit 201 on the display 100. The display control unit 206 according to the present exemplary embodiment also displays on the display 400 a plurality of placement candidates as candidates where the object in the image capturing range is to be placed. The details of the placement candidates displayed by the display control unit 206 will be described below.

A range control unit 207 performs the process of controlling the image capturing range of the imaging apparatus 100. Specifically, the range control unit 207 generates a control command to change at least any of the pan value, the tilt value, or the zoom value of the imaging apparatus 100 and transmits the control command to the imaging apparatus 100 via the communication unit 201. The imaging apparatus 100 controls the image capturing range based on the transmitted control command. For example, if the operation reception unit 205 receives an instruction from the user to change the pan value of the imaging apparatus 100 by a predetermined value in the pan direction 105, the operation reception unit 205 performs the following process. The range control unit 207 generates a control command to change the pan value by the predetermined value in the pan direction 105 and transmits the control command to the imaging apparatus 100 via the communication unit 201, The imaging apparatus 100 follows the control command to control the pan driving unit 103 to change the pan angle by the predetermined angle in the pan direction 105.

The following is a description of the process of generating a plurality of placement candidates to display the placement candidates on the display 400 with reference to FIGS. 5, 6A, 6B, 7A, 713, 7C, and 8. FIG. 5 is a flowchart illustrating a procedure of the process of generating the placement candidates to display on the display 400.

In step S501, the display control unit 206 determines whether objects specified as references for controlling the image capturing range by the specifying unit 204 are present. If it is determined that people specified by the specifying unit 204 are present (Yes in step S501), the processing proceeds to step S502. Otherwise (No in step S501), the process of step S501 is repeated. Now the process will be described in which the specifying unit 204 specifies an object (hereinafter, a "reference object") as a reference for controlling the image capturing range. For example, the detection unit 203 performs a detection process to detect objects on an image. The display control unit 206 displays frames indicating the positions of the detected objects in a superimposed manner on the image on the display 400. Then, if the operation reception unit 205 receives an operation from the user for selecting at least any one of the frames displayed in a superimposed manner on the image, the specifying unit 204 specifies the object corresponding to the frame selected based on the operation from the user as a reference object. For example, if the detection unit 203 detects four people as objects on a captured image, the display control unit 206 displays circumscribed rectangular frames for the four detected people in a superimposed manner on the image on the display 400. Then, if the operation reception unit 205 receives an operation from the user for selecting a frame corresponding to a certain person of the frames superimposed on the four people, the specifying unit 204 specifies the certain person corresponding to the selected frame as a reference object.

Next, in step S502, the display control unit 206 determines whether the number of reference objects specified in step S501 is one. If it is determined that the number of specified reference objects is one (Yes in step S502), the processing proceeds to step S503. Otherwise (No in step S502), the processing proceeds to step S504. In step S503, the display control unit 206 displays information regarding placement candidates for a single person on the display 400. The information regarding placement candidates will be described below with reference to FIGS. 6A and 6B. In step S504, the display control unit 206 determines whether the number of specified reference objects is two. If it is determined that the number of specified reference objects is two (Yes in step S504), the processing proceeds to step S505. Otherwise (No in step S504), the processing proceeds to step S506. In step S505, the display control unit 206 displays information regarding placement candidates for two people on the display 400. In step S506, the display control unit 206 displays placement candidates in which all the people fall within the angle of view on the display 400.

The following is a description of information regarding placement candidates displayed on the display 400 by the display control unit 206 with reference to FIGS. 6A and 6B. The display control unit 206 according to the present exemplary embodiment displays on the display 400 a display window 601 including an image display area 602, where an image captured by the imaging apparatus 100 is displayed, and a candidate display area 605, where a plurality of placement candidates is displayed. In some embodiments, the display control unit 206 displays the image display area 602 and the candidate display area 605 separately in different windows on the display 400. As illustrated in FIG. 6A, the image including a person 604 specified as a reference object by the specifying unit 204 is displayed in the image display area 602. The display control unit 206 displays a frame 603 corresponding to the position of the person 604 in a superimposed manner on the image. The display control unit 206 also displays the candidate display area 605 including at least information regarding a first placement candidate 606 in which the object is placed at a first position in the image capturing range of the imaging apparatus 100, and information regarding a second placement candidate 608 in which the object in the image capturing range is placed at a second position different from the first position. As illustrated in FIG. 6A, in the candidate display area 605, the first placement candidate 606 is displayed as a figure in which an icon 607 representing the object is placed on the left side of the rectangular area indicating the image capturing range.

In the candidate display area 605, the second placement candidate 608 is displayed as a figure in which an icon 609 representing the object is placed at the center of the rectangular area indicating the image capturing range. In the candidate display area 605, a third placement candidate 610 is displayed as a figure in which an icon 611 representing the object is placed on the right side of the rectangular area indicating the image capturing range. In the example illustrated in FIG. 6A, three different placement candidates are displayed. The present disclosure, however, is not limited to that configuration. In some embodiments, a different number of placement candidates are displayed.

The process will be described that is performed for the first placement candidate 606 selected from among the placement candidates in FIG. 6A, if the first placement candidate 606 is selected by an operation from the user, the range control unit 207 performs the following process. The range control unit 207 performs the process of controlling the image capturing range of the imaging apparatus 100 so that the positional relationship of the object to the image capturing range indicated by the first placement candidate 606 and the positional relationship of the person 604 as the reference object to the current image capturing range of the imaging apparatus 100 will be the same as each other. Specifically, the range control unit 207 specifies the gravity point of the icon 607 representing the object with respect to the rectangular area representing the image capturing range in the first placement candidate 606. Further, the range control unit 207 specifies the gravity point of the person 604 as the reference object with respect to the current image capturing range of the imaging apparatus 100. Then, the range control unit 207 generates a control command to control the image capturing range so that the relative positional relationship of the gravity point of the icon 607 to the rectangular area of the first placement candidate 606 and the relative positional relationship of the gravity point of the person 604 to the current image capturing range will be the same as each other. The control command generated at this time is transmitted to the imaging apparatus 100 via the communication unit 201. Based on the transmitted control command, the imaging apparatus 100 controls at least any of the pan value, the tilt value, or the zoom value, thereby controlling the image capturing range. The image captured after the image capturing range of the imaging apparatus 100 is thus controlled is transmitted from the imaging apparatus 100 to the information processing apparatus 200. FIG. 6B illustrates an example where the image captured and transmitted after the image capturing range of the imaging apparatus 100 is controlled based on the selection of the placement candidate is displayed in the image display area 602 by the display control unit 206. FIG. 6B illustrates a generated image in which the positional relationship of the object to the image capturing range indicated by the first placement candidate 606 and the positional relationship of the object (the person 604) to the actual image capturing range are similar to each other. As illustrated in FIG. 6B, the display control unit 206 makes the display forms of the second placement candidate 608 and the third placement candidate 610 different from the one of the first placement candidate 606. That shows the selected first placement candidate 606 to the user.

Figure 7A:
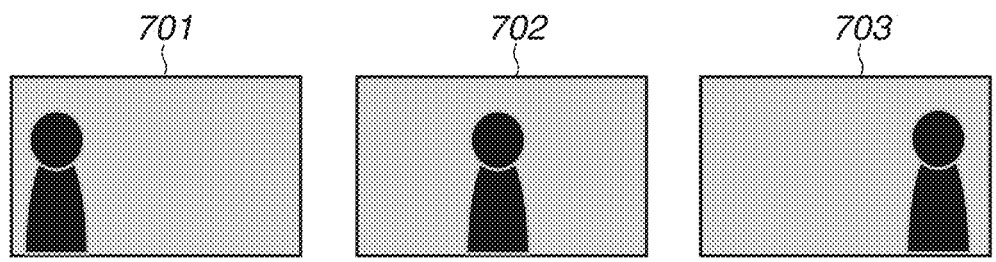
FIGS. 7A to 7C are diagrams illustrating displayed placement candidates.
Figure 7B:
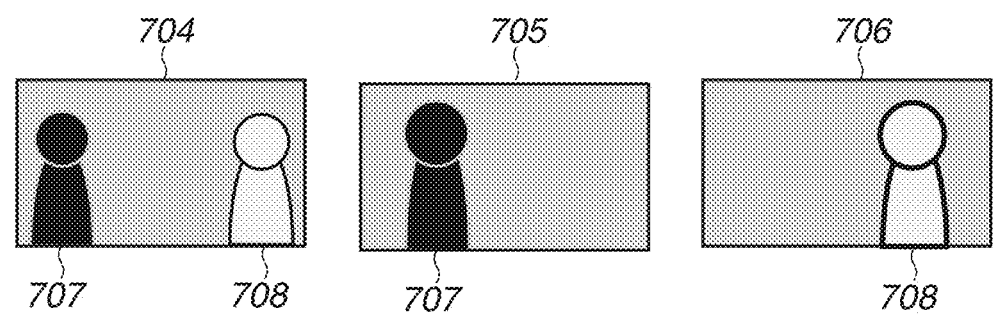
Figure 7C:
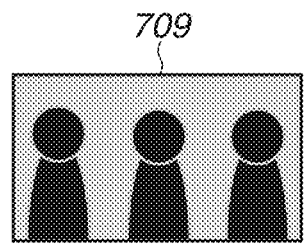

While the example in FIGS. 6A and 6B illustrates placement candidates displayed for a single person, FIGS. 7A to 7C illustrate placement candidates displayed for different numbers of people, which will be now described. FIG. 7A illustrates an example of a plurality of placement candidates for a single person. Placement candidates 701 to 703 are similar to the placement candidates 606, 608, and 610, respectively, illustrated in FIGS. 6A and 6B, and the redundant description will be omitted. FIG. 7B illustrates an example of a plurality of placement candidates for two people. Placement candidates 704 to 706 illustrated in FIG. 7B are information displayed in the candidate display area in the process of step S505. The placement candidate 704 shows an icon 707 corresponding to a first person specified in the image placed on the left side of the image capturing range, and an icon 708 corresponding to a second person specified in the image placed on the right side of the image capturing range. The placement candidate 705 shows the icon 707 corresponding to the first person zoomed in on the left side. The placement candidate 706 shows the icon 708 corresponding to the second person zoomed in on the right side. A placement candidate 709 illustrated in FIG. 7C is the placement candidate displayed in the candidate display area by the display control unit 206 in step S506 in response to the determination in step S504 in FIG. 5 that the number of the reference objects is not two. The placement candidate 709 shows N people (N is an integer) specified by the specifying unit 204 at this time within the angle of view. In the present exemplary embodiment, if the placement candidate 709 is selected, the range control unit 207 generates a control command to control the image capturing range of the imaging apparatus 100 so that the N specified people will fall within the angle of view. Then, the range control unit 207 transmits the control command to the imaging apparatus 100. The placement candidates to be displayed are not limited to those in FIGS. 7A to 7C, and another placement candidate may be added.

The processing will be now described that controls the image capturing range based on the selection of a placement candidate by the user, with reference to a flowchart illustrated in FIG. 8. The processing in the steps illustrated in FIG. 8 starts or ends, for example, following an instruction given by the user. For example, the processing in the flowchart illustrated in FIG. 8 is performed by the functional blocks of the information processing apparatus 200 illustrated in FIG. 4 being operated by the CPU 1000 of the information processing apparatus 200 running computer programs stored in the ROM 1020 of the information processing apparatus 200.

First, in step S801, the range control unit 207 determines whether any of the placement candidates displayed in the candidate display area 605 is selected. If it is determined that any of the placement candidates is selected (Yes in step S801), the processing proceeds to step S802. Otherwise (No in step S801), the processing returns to step S801. In step S802, based on information regarding the position of the object relative to the image capturing range indicated by the selected placement candidate, the range control unit 207 determines the pan value and the tilt value in controlling the image capturing range. The process to be performed will here be described where the first placement candidate 606 is selected in the example illustrated in FIG. 6A. At this time, in step S802, the range control unit 207 performs the following process. The range control unit 207 determines the pan value and the tilt value in controlling the image capturing range so that the relative positional relationship of the gravity point of the icon 607 to the rectangular area of the first placement candidate 606 and the relative positional relationship of the gravity point of the person 604 to the actual image capturing range will be the same as each other. In step S803, based on information regarding the size of the object relative to the image capturing range indicated by the selected placement candidate, the range control unit 207 determines the zoom value in controlling the image capturing range. The following is a description on the assumption that the first placement candidate 606 is selected. The range control unit 207 determines the zoom value of the imaging apparatus 100 so that the relative size of the icon 607 to the rectangular area of the first placement candidate 606 and the relative size of the person 604 to the actual image capturing range will be the same as each other. In step S804, the range control unit 207 generates a control command to control the imaging apparatus 100 with the pan value, the tilt value, and the zoom value determined in steps S802 and S803. In step S805, the communication unit 201 transmits the control command generated in step S804 to the imaging apparatus 100. The imaging apparatus 100 analyzes the transmitted control command, and based on the result of the analysis, controls at least any of the pan driving unit 103, the tilt driving unit 104, or the lens driving unit 102, thereby controlling the range of the imaging apparatus 100.

As described above, based on a placement candidate selected from among a plurality of displayed different placement candidates, the information processing apparatus 200 according to the present exemplary embodiment controls the image capturing range of the imaging apparatus 100 so that an object will be captured in a composition similar to that of the placement candidate. This allows simple control of an image capturing range so that an object will be placed at a position desired by a user in the image capturing range.

A second exemplary embodiment of the present disclosure will be described. In the second exemplary embodiment, a case will be described where the display form of an icon displayed in a placement candidate in a candidate display area and the display form of a frame indicating a reference object corresponding to the icon in an image display area are associated with each other. The differences from the first exemplary embodiment will be mainly described. Like numbers refer to like components and processes in the first exemplary embodiment, and redundant descriptions will be omitted.

Figure 9A:
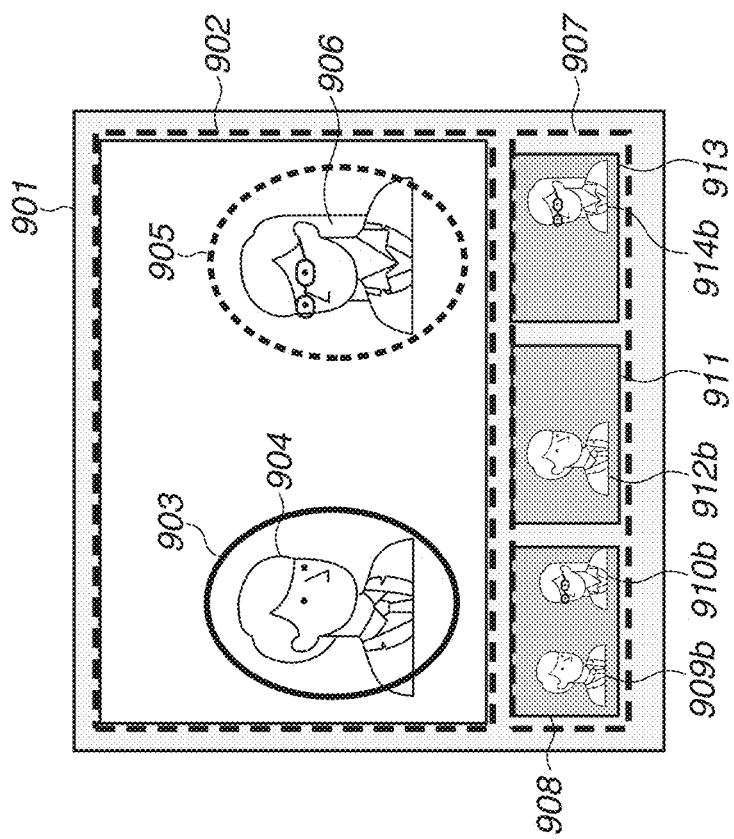
FIGS. 9A and 9B illustrate an example of an image and placement candidates on a display.
Figure 9B:
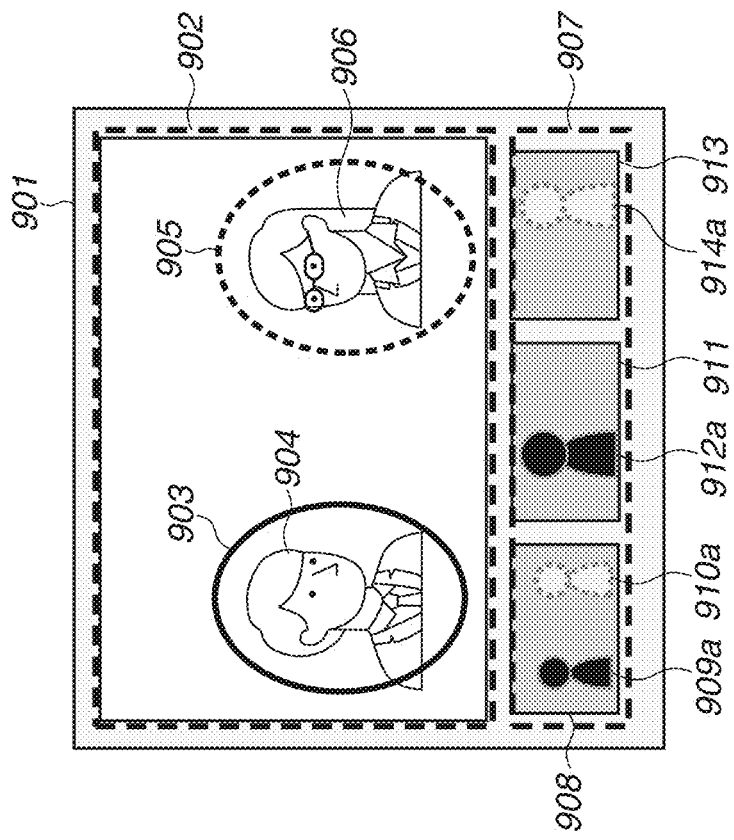

Information displayed on the display 400 by the display control unit 206 according to the present exemplary embodiment will be described with reference to FIGS. 9A and 9B. The display control unit 206 displays on the display 400 a display window 901 including an image display area 902, where an image captured by the imaging apparatus 100 is displayed, and a candidate display area 907, where a plurality of placement candidates is displayed. In some embodiments, the display control unit 206 displays the image display area 902 and the candidate display area 907 separately in different windows on the display 400. FIG. 9A illustrates the image including people 904 and 906 specified as reference objects by the specifying unit 204, displayed in the image display area 902. The display control unit 206 displays a frame 903 corresponding to the position of the person 904 and a frame 905 corresponding to the position of the person 906 in a superimposed manner on the image. The display control unit 206 also displays the candidate display area 907 including placement candidates 908, 911, and 913 as placement candidates for two people. In the example illustrated in FIG. 9A, the placement candidate 908 includes an icon 909a corresponding to the person 904 specified in the image placed on the left side of the image capturing range and an icon 910a corresponding to the person 906 specified in the image placed on the right side. The placement candidate 911 includes an icon 912a corresponding to the person 904 zoomed in on the left side. The placement candidate 913 includes an icon 914a corresponding to the person 906 zoomed in on the right side. As illustrated in FIG. 9A, the display control unit 206 according to the present exemplary embodiment displays a frame indicating a person specified as a reference object and an icon in a placement candidate corresponding to the person, using a display form clearly indicating the association between the frame and the icon to the user. Specifically, in the example illustrated in FIG. 9A, the outer edges of the frame 903 indicating the person 904 and the icons 909a and 912a corresponding to the person 904 are indicated by solid lines.

In the example illustrated in FIG. 9A, the outer edges of the frame 905 indicating the person 906 and the icons 910a and 914a corresponding to the person 906 are indicated by dotted lines. A method of clearly indicating the association between a frame indicating a person and an icon corresponding to the person is not limited to a method of indicating the person and the icon by a solid line or a dotted line. For example, the display control unit 206 may perform the following display. The display control unit 206 displays the frame 903 indicating the person 904 and the icons 909a and 912a corresponding to the person 904 in a first color. Further, the display control unit 206 displays the frame 905 indicating the person 906 and the icons 910a and 914a corresponding to the person 906 in a second color different from the first color. Alternatively, as a method of clearly indicating the association between a person and an icon corresponding to the person, the display control unit 206 may use a clipped image of the person. Specifically, as illustrated in FIG. 9B, the display control unit 206 may use clipped images 909b and 912b, clipped images of the person 904, instead of the icons 909a and 912a, respectively. The display control unit 206 may also use clipped images 910b and 914b, clipped images of the person 906, instead of the icons 910a and 914a, respectively.

As described above, the information processing apparatus 200 according to the present exemplary embodiment provides a clear display indicating the association between a figure superimposed on an image corresponding to a person specified from the image and a figure displayed in the placement candidate corresponding to the person. This allows simple control of an image capturing range to place an object at a position desired by a user in the image capturing range.

Other Exemplary Embodiments

Next, the hardware configuration of the information processing apparatus 200 to carry out the functions of each of the exemplary embodiments will be described with reference to FIG. 10. Although the hardware configuration of the information processing apparatus 200 is described below, the imaging apparatus 100 is also built with a similar hardware configuration.

The information processing apparatus 200 according to the present exemplary embodiment includes a CPU 1000, a RAM 1010, a ROM 1020, an HDD 1030, and an I/F 1040.

The CPU 1000 is a central processing unit that performs the general control of the information processing apparatus

200. The RAM 1010 temporarily stores computer programs run by the CPU 1000. The RAM 1010 serves as a work area used in processing performed by the CPU 1000. For example, the RAM 1010 functions as a frame memory or functions as a buffer memory.

The ROM 1020 stores programs for the CPU 1000 to control the information processing apparatus 200. The HDD 1030 is a storage device to record image data.

The I/F 1040 communicates with an external apparatus via the network 300 in accordance with the Transmission Control Protocol/Internet Protocol (TCP/IP) or the Hypertext Transfer Protocol (HTTP).

Although the example where the CPU 1000 performs processing is described in the above exemplary embodiments, at least a part of the processing of the CPU 1000 may be performed by dedicated hardware. For example, the processing of displaying a graphical user interface (GUI) or image data on the display 400 may be performed by a graphics processing unit (GPU). The processing of reading program codes from the ROM 1020 and loading the program codes into the RAM 1010 may be performed by direct memory access (DMA), which functions as a transfer apparatus.

The present disclosure can be implemented also by the processing of causing one or more processors to read and run programs for carrying out one or more functions of the above exemplary embodiments. The programs may be supplied to a system or an apparatus including the one or more processors via a network or a storage medium.

The present disclosure can be implemented also by a circuit (e.g., an application-specific integrated circuit (ASIC)) for carrying out the one or more functions of the above exemplary embodiments. The components of the information processing apparatus 200 may be replaced with the hardware illustrated in FIG. 10, or can also be replaced with corresponding software.

Another apparatus may have one or more functions of the information processing apparatus 200 according to each of the above exemplary embodiments. For example, the imaging apparatus 100 may have one or more functions of the information processing apparatus 200 according to each of the exemplary embodiments. The above exemplary embodiments may be carried out by combining the above exemplary embodiments, such as any combination of the above exemplary embodiments.

While the present disclosure has been described together with exemplary embodiments, the above exemplary embodiments merely illustrate specific examples in implementing the present disclosure, and the technical scope of the present disclosure should not be interpreted in a limited manner based on these exemplary embodiments, That is, the present disclosure can be implemented in various ways without departing from the technical ideas or the main features of the present disclosure. For example, the combinations of the exemplary embodiments are also included in the disclosed content of the specification.

According to the above exemplary embodiments, users can perform simple control of an image capturing range to place an object at a desired position in the image capturing range.

Embodiment(s) of the present disclosure can also be realized by a computer of a system or apparatus that reads out and executes computer executable instructions (e.g, one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)?), a flash memory device, a memory card, and the like.

While the present disclosure has been described with reference to exemplary embodiments, it is to be understood that the present disclosure is not limited to the disclosed exemplary embodiments. The scope of the following claims is to be accorded the broadest interpretation so as to encompass all such modifications and equivalent structures and functions.

This application claims the benefit of Japanese Patent Application No, 2020-209353, filed Dec. 17, 2020, which is hereby incorporated by reference herein in its entirety.

What is claimed is:

1. An information processing apparatus comprising a computer executing instructions that, when executed by the computer, cause the computer to:
   acquire an image captured by an image capturing apparatus;
   cause a display to display the acquired image; and
   perform control process for controlling an image capturing range of the image capturing apparatus,
   wherein a first placement candidate in which an object in the image capturing range is placed at a first position, and a second placement candidate in which the object in the image capturing range is placed at a second position different from the first position are displayed on the display, and
   wherein in a case where the first placement candidate is selected by a user, the image capturing range is controlled so that the object is placed at the first position in the imaging capturing range, and
   in a case where the second placement candidate is selected by the user, the image capturing range is controlled so that the object is placed at the second position in the image capturing range,
   wherein when the first placement candidate is selected, the image capturing range is adjusted so that the object is captured in a composition equal to the first placement candidate.

2. The information processing apparatus according to claim 1,
   wherein the instructions further cause the computer to specify an object included in the image, as a reference for the controlling of the image capturing range.

3. The information processing apparatus according to claim 2, wherein the instructions further cause the computer to detect an object included in the image, wherein an object selected based on a user operation from among detected objects is specified as a reference for the controlling of the image capturing range.

4. The information processing apparatus according to claim 1, wherein an image display area including the image, and a candidate display area including the first and second placement candidates are displayed on the display.

5. The information processing apparatus according to claim 1, wherein the first placement candidate displayed on the display is a figure in which an icon representing the object is placed at a position corresponding to the first position in an area representing the image capturing range, and wherein the second placement candidate displayed on the display is a figure in which an icon representing the object is placed at a position corresponding to the second position in an area representing the image capturing range.

6. An information processing method comprising:

acquiring an image captured by an image capturing apparatus;

causing a display to display the acquired image; and performing control process for controlling an image capturing range of the image capturing apparatus, wherein, in the causing, the display is caused to display a first placement candidate in which an object in the image capturing range is placed at a first position, and a second placement candidate in which the object in the image capturing range is placed at a second position different from the first position, and wherein in a case where the first placement candidate is selected by a user, the image capturing range is controlled so that the object is placed at the first position in the imaging capturing range, and in a case where the second placement candidate is selected by the user, the image capturing range is controlled so that the object is placed at the second position in the image capturing range, wherein when the first placement candidate is selected, the image capturing range is adjusted so that the object is captured in a composition equal to the first placement candidate.

7. A non-transitory computer readable storage medium storing a program to cause a computer to execute a method, the method comprising:

acquiring an image captured by an image capturing apparatus;

causing a display to display the acquired image; and performing control process for controlling an image capturing range of the image capturing apparatus, wherein, in the causing, the display is caused to display a first placement candidate in which an object in the image capturing range is placed at a first position, and a second placement candidate in which the object in the image capturing range is placed at a second position different from the first position, and wherein in a case where the first placement candidate is selected by a user, the image capturing range is controlled so that the object is placed at the first position in the imaging capturing range, and in a case where the second placement candidate is selected by the user, the image capturing range is controlled so that the object is placed at the second position in the image capturing range, wherein when the first placement candidate is selected, the image capturing range is adjusted so that the object is captured in a composition similar equal to the first placement candidate.

* * * * *